(12) United States Patent
Sugimoto et al.

(10) Patent No.: US 6,620,748 B1
(45) Date of Patent: *Sep. 16, 2003

(54) LIGHT-AMPLIFYING GLASS, LIGHT-AMPLIFYING MEDIUM AND RESIN-COATED LIGHT-AMPLIFYING MEDIUM

(76) Inventors: Naoki Sugimoto, c/o Asahi Glass Company, Limited, 1150, Hazawa-cho, Kanagawa-ku, Yokohama-shi, Kanagawa 221-8755 (JP); Yutaka Kuroiwa, c/o Asahi Glass Company, Limited, 1150, Hazawa-cho, Kanagawa-ku, Yokohama-shi, Kanagawa 221-8755 (JP); Setsuro Ito, c/o Asahi Glass Company, Limited, 1150, Hazawa-cho, Kanagawa-ku, Yokohama-shi, Kanagawa 221-8755 (JP); Setsuhisa Tanabe, 1st20A, Chateau Fukakusa, 3-89, Fukakusanishiura-cho, Fushimi-ku, Kyoto-shi, Kyoto 612-0029 (JP); Teiichi Hanada, 2-29-3, Keyakizaka, Kawanishi-shi, Hyogo 666-0145 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/807,426

(22) PCT Filed: Jan. 19, 1999

(86) PCT No.: PCT/JP99/05764

§ 371 (c)(1),
(2), (4) Date: Apr. 20, 2001

(87) PCT Pub. No.: WO00/23392

PCT Pub. Date: Apr. 27, 2000

(30) Foreign Application Priority Data

| Oct. 20, 1998 | (JP) | 10-298625 |
| Oct. 14, 1999 | (JP) | 11-292796 |
| Oct. 7, 1999 | (JP) | 11-287354 |
| Feb. 26, 1999 | (JP) | 11-051452 |
| Sep. 3, 1999 | (JP) | 11-250654 |
| Apr. 27, 1999 | (JP) | 11-120526 |

(51) Int. Cl.$^7$ .................. C03C 3/095; C03C 3/068; C03C 13/04; C03C 3/15; H04B 10/12

(52) U.S. Cl. ............... 501/64; 501/37; 501/50; 501/78; 359/341.1; 359/341.5

(58) Field of Search ................. 501/35, 37, 41, 501/49, 50, 64, 73, 77, 78; 522/33; 350/96.3; 359/341.5, 341.1

(56) References Cited

U.S. PATENT DOCUMENTS

| 3,867,303 | A | | 2/1975 | Shaw et al. |
| 4,923,279 | A | * | 5/1990 | Ainslie et al. ............. 372/6 |
| 5,773,486 | A | * | 6/1998 | Chandross et al. ......... 522/14 |
| 2002/0041436 | A1 | * | 4/2002 | Kondo et al. ............ 359/341.5 |

FOREIGN PATENT DOCUMENTS

| JP | 3-218945 | | 9/1991 |
| JP | 8-110535 | | 4/1996 |
| JP | 1123645 | * | 8/1999 |
| JP | 11-236245 | | 8/1999 |

OTHER PUBLICATIONS

Patent Abstracts of Japan, vol. 2000, No. 02, Feb. 29, 2000, and JP 11 317561 A, Nov. 16, 1999.

* cited by examiner

*Primary Examiner*—David Sample
*Assistant Examiner*—Elizabeth A. Bolden (57) ABSTRACT

An optical amplifying glass comprising a matrix glass and, added thereto, from 0.01 to 10 wt % of Er, characterized in that said matrix glass substantially comprises, as represented by mol %, 20 to 80 of $Bi_2O_3$, 0 to 74.89 of $B_2O_3$, 0 to 79.99 of $SiO_2$, 0.01 to 10 of $CeO_2$, 0 to 50 of $Li_2O$, 0 to 50 of $TiO_2$, 0 to 50 of $ZrO_2$, 0 to 50 of $SnO_2$, 0 to 30 of $WO_3$, 0 to 30 of $TeO_2$, 0 to 30 of $Ga_2O_3$ and 0 to 10 of $Al_2O_3$, with the proviso that said matrix glass contains at least one of $B_2O_3$ and $SiO_2$.

32 Claims, 6 Drawing Sheets

LIGHT-AMPLIFYING GLASS, LIGHT-AMPLIFYING MEDIUM AND RESIN-COATED LIGHT-AMPLIFYING MEDIUM

TECHNICAL FIELD

The present invention relates to an optical amplifying glass, an optical amplifying medium and a resin-coated optical amplifying medium. Particularly, it relates to an optical amplifying glass, an optical amplifying medium and a resin-coated optical amplifying medium, which are capable of amplification in a broad band for light with a wavelength of from 1.45 to 1.64 μm.

BACKGROUND ART

For the purpose of application to an optical amplifier in an optical communication system, an optical amplifying medium (such as an optical amplifying fiber or an optical amplifying waveguide) comprising a clad glass and a core glass having a rare earth element doped, is being developed. Particularly, an optical amplifying medium wherein the above-mentioned rare earth element is Er (erbium), is actively being developed.

On the other hand, in order to cope with diversification of communication services expected in future, a wavelength division multiplexing optical communication system (WDM) has been proposed to increase the transmission capacity. In WDM, the transmission capacity increases as the number of wavelength division multiplexing channels increases. Accordingly, an optical amplifying medium is desired which is capable of amplification in a broad band for light with a wavelength of from 1.45 to 1.64 μm.

In the case of a conventional Er-doped quartz type glass fiber, the wavelength width wherein an adequate gain is obtainable for light with a wavelength of from 1.45 to 1.64 μm, is as narrow as from about 10 to 30 nm. Consequently, the number of wavelength division multiplexing channels is limited to a level of from 30 to 40 channels.

To obtain a larger wavelength width, an optical amplifier has been proposed wherein optical amplifying media having different gain spectra, are arranged in series to make amplification possible in a broad band. However, such an optical amplifier has had a problem such that the structure tends to be complex, or in the vicinity of the center of the wavelength range, there is a region where no amplification is possible.

Further, JP-A-8-110535 discloses an optical amplifying medium having a core glass made of an Er-doped tellurite type glass. For example, it is disclosed that with an optical amplifier glass fiber having a core glass having 1000 ppm of Er doped to a glass comprising $TeO_2$ (75 mol %), ZnO (13 mol %), $Na_2O$ (3 mol %), $Bi_2O_3$ (4 mol %) and $P_2O_5$ (3 mol %), the gain became flat in a width of 70 nm from 1530 nm to 1600 nm (page 4, right column, lines 15–30).

However, the glass transition point of the tellurite type glass is likely to be low. For example, glass transition points of various tellurite type glasses are shown in Table 5 and Table 6 in Optical Materials 3 (1994) 193, whereby the maximum value is 343° C., and the minimum value is 294° C. If the glass transition point is low like this, the glass is likely to be thermally damaged when a laser beam having a high intensity is used as pumping light for optical amplification.

The present invention has an object to provide an optical amplifying glass and an optical amplifying medium, whereby a wavelength width wherein the gain is obtainable for light with a wavelength of from 1.45 to 1.64 μm, is broad, and the above-mentioned thermal damage is unlikely to occur.

DISCLOSURE OF THE INVENTION

The present invention provides an optical amplifying glass comprising a matrix glass and, added thereto, from 0.01 wt % to 10 wt % of Er, characterized in that said matrix glass substantially comprises, as represented by mol %:

| | |
|---|---|
| $Bi_2O_3$ | 20 to 80, |
| $B_2O_3$ | 0 to 74.89, |
| $SiO_2$ | 0 to 79.99, |
| $CeO_2$ | 0.01 to 10, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |
| $Ga_2O_3$ | 0 to 30, and |
| $Al_2O_3$ | 0 to 10, | with the proviso that said matrix glass contains at least one of $B_2O_3$ and $SiO_2$.

Further, the present invention provides an optical amplifying medium comprising a core glass and a clad glass, wherein a relation of:

$$0.0005 \leq (n_1 - n_2)/n_1 \leq 0.1$$

where $n_1$ and $n_2$ are refractive indices of the core glass and the clad glass, respectively, to light with a wavelength of 1.55 μm, is satisfied, and the core glass is an optical amplifying glass comprising a matrix glass and, added thereto, from 0.01 wt % to 10 wt % of Er, characterized in that said matrix glass contains $Bi_2O_3$ within a range of from 20 mol % to 80 mol %, at least one of $B_2O_3$ and $SiO_2$, and $CeO_2$ within a range of from 0.01 mol % to 10 mol %.

Still further, the present invention provides a resin-coated optical amplifying medium characterized in that the above optical amplifying medium is covered with a resin.

With the optical amplifying glass of the present invention, typically, the wavelength width wherein the gain is obtainable for light with a wavelength of from 1.45 to 1.64 μm (hereinafter, this wavelength width is referred to as Δλ), is at least 80 nm. Further, its glass transition point is typically at least 360° C.

BEST MODE FOR CARRYING OUT THE INVENTION

Figure 5:
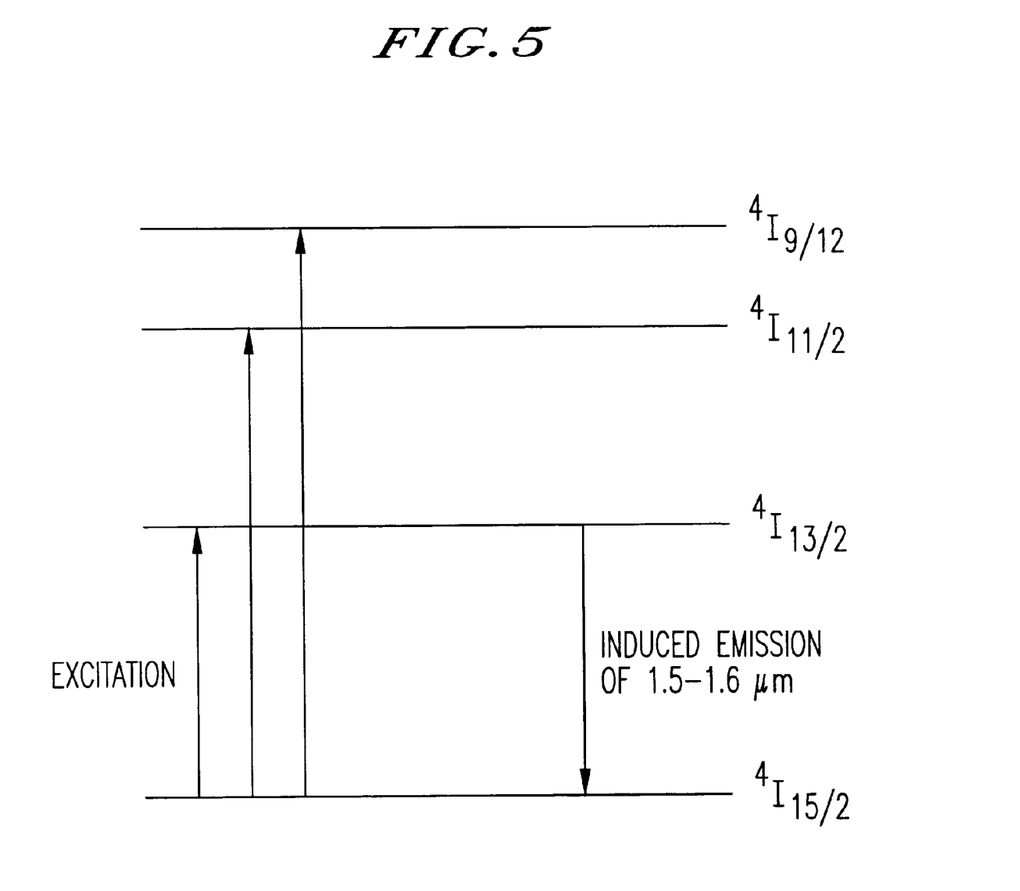
FIG. 5 is an energy level diagram of $Er^{3+}$ ions.

The optical amplifying glass of the present invention is one having Er added to the matrix glass and utilizes stimulated emission transition from the $^4I_{13/2}$ level to the $^4I_{15/2}$ level of Er. FIG. 5 shows the energy level diagram of $Er^{3+}$ ions, which shows light emission by the transition from an upper level of the $^4I_{13/2}$ level to a lower level of the $^4I_{15/2}$ level.

When the optical amplifying glass of the present invention containing Er is used as an optical amplifier, laser beams are usually employed as pumping light and signal light, and the signal light is amplified by utilizing the stimulated emission transition from the $^4I_{13/2}$ level to the $^4I_{15/2}$ level of Er.

The optical amplifying glass of the present invention preferably has $\Delta\lambda$ of at least 80 nm, more preferably at least 90 nm, still more preferably at least 100 nm, most preferably at least 110 nm.

The following reason is considered to be a reason why the optical amplifying glass of the present invention shows light emission in a wide wavelength range as compared with an Er-doped quartz type glass having $\Delta\lambda$ of a level of from 10 to 30 nm. Namely, in the optical amplifying glass of the present invention, Bi ions as heavy element ions are contained in a high concentration, whereby the light-electric field interaction in the glass is large. Accordingly, the width of the energy level of Er such as the $^4I_{13/2}$ level or the $^4I_{15/2}$ level is broad due to the Stark effect, whereby light emission takes place in a wider wavelength range.

The glass transition point of the optical amplifying glass of the present invention is preferably at least 360° C., for such a reason that when a laser beam having a high intensity is used as pumping light for optical amplification, the temperature of the glass tends to be locally high, and if the glass transition point is lower than 360° C., the glass is likely to be thermally damaged, and consequently, the light loss tends to increase, and the optical amplification tends to be inadequate. More preferably, it is at least 380° C., particularly preferably at least 400° C., most preferably at least 410° C.

The amount of Er to be added to the matrix glass for the purpose of optical amplification, is adjusted to be small in a case where the optical amplifying medium (such as an optical amplifying fiber or an optical amplifying waveguide) comprising a core glass and a clad glass is long, and to be large in a case where the optical amplifying medium is short.

Such an amount of Er in the present invention is from 0.01 to 10 wt %. If it is less than 0.01 wt %, the optical amplification tends to be inadequate, and particularly, the optical amplification gain tends to decrease. It is preferably at least 0.1 wt %, more preferably at least 0.2 wt %. If it exceeds 10 wt %, vitrification tends to be difficult, or optical quenching by concentration tends to occur, whereby the optical amplification tends to be inadequate, particularly the optical amplification gain tends to be inadequate. It is preferably at most 8 wt %, more preferably at most 6 wt %. Here, the amount of Er is represented, on the basis that the matrix glass is 100 wt %. Further, "the optical amplification is inadequate" means that the optical amplification gain is inadequate or the wavelength width wherein the gain is obtainable, is inadequate.

Now, the components of the matrix glass will be described, wherein mol % will be represented simply as %.

$Bi_2O_3$ is an essential component. If its content is less than 20%, the optical amplification tends to be inadequate. It is preferably at least 25%, more preferably at least 30%. If it exceeds 80%, vitrification tends to be difficult, or devitrification tends to take place during forming such as processing into a fiber (hereinafter referred to simply as during forming), or the glass transition point tends to be too low. It is preferably at most 70%, more preferably at most 65%, particularly preferably at most 60%.

Here, devitrification is meant for distinct precipitation of crystals, which causes breakage of the fiber during the fiber processing or the breakage of the fiber during use as an optical amplifying glass fiber.

$B_2O_3$ and $SiO_2$ are network formers, and at least one of them must be contained in order to facilitate formation of glass by suppressing precipitation of crystals at the time of the preparation of glass. In such a case, only $B_2O_3$ may be contained without containing $SiO_2$, or only $SiO_2$ may be contained without containing $B_2O_3$, or both $B_2O_3$ and $SiO_2$ may be contained. If neither $B_2O_3$ nor $SiO_2$ is contained, vitrification tends to be difficult. Further, $SiO_2$ has an effect to control precipitation of crystals at the time of the preparation of glass, thereby to increase the content of $B_2O_3$.

The total content of $B_2O_3$ and $SiO_2$ is preferably within a range of from 5 to 74.89%. If it is less than 5%, vitrification is likely to be difficult, or the optical amplification is likely to be inadequate, or devitrification is likely to occur during forming. It is more preferably at least 10%, particularly preferably at least 15%. If it exceeds 74.89%, the optical amplification is likely to be inadequate. It is more preferably at most 74.79%, still more preferably at most 63%, particularly preferably at most 60%, most preferably at most 55%.

When $B_2O_3$ is contained, the upper limit of its content is 74.89%. If it exceeds 74.89%, the optical amplification tends to be inadequate. It is preferably at most 74.79%, more preferably at most 69%.

Further, when $B_2O_3$ is contained, its content is preferably at least 15%. If it is less than 15%, vitrification is likely to be difficult. It is more preferably at least 20%, particularly preferably at least 24%.

Further, when the content of $SiO_2$ is at least 15%, the content of $B_2O_3$ is preferably at most 14.99%. If it exceeds 14.99%, the optical amplification is likely to be inadequate. It is more preferably at most 10%.

When $SiO_2$ is contained, the upper limit of its content is 79.99%. If it exceeds 79.99%, the optical amplification tends to be inadequate. It is preferably at most 74.89%, more preferably at most 74.79%, still more preferably at most 70%, particularly preferably at most 60%, most preferably at most 50%.

Further, when the content of $B_2O_3$ is less than 14.99%, the content of $SiO_2$ is preferably at least 15%. If it is less than 15%, vitrification is likely to be difficult. It is more preferably at least 20%, particularly preferably at least 30%.

$CeO_2$ is an essential component and has an effect to suppress reduction of $Bi_2O_3$ in the glass composition during melting of glass to precipitate metal bismuth thereby to lower the transparency of glass. If the content of $CeO_2$ is less than 0.01%, its effect tends to be inadequate. It is preferably at least 0.1%, more preferably at least 0.15%. If it exceeds 10%, vitrification tends to be difficult. It is preferably at most 5%, more preferably at most 1%, particularly preferably at most 0.5%.

Each of $Li_2O$, $TiO_2$, $ZrO_2$ and $SnO_2$ is not essential, but each of them may be contained within a range of up to 50%, in order to suppress devitrification during formation of glass thereby to increase the content of $Bi_2O_3$.

Each of $SiO_2$, $Li_2O$, $TiO_2$, $ZrO_2$ and $SnO_2$ is not essential, but at least one member selected from the group consisting of them may be contained in a total of up to 50%. If it exceeds 50%, the optical amplification is likely to be inadequate.

$WO_3$ is not essential, but may be contained up to 30% in order to increase $\Delta\lambda$. If its content exceeds 30%, the optical amplification gain is likely to decrease. It is more preferably at most 20%, particularly preferably at most 17%.

$Ga_2O_3$ is also not essential, but may be contained up to 30% in order to increase $\Delta\lambda$ or in order to suppress devitrification during forming. If its content exceeds 30%, the optical amplification gain is likely to decrease. It is more preferably at most 20%, particularly preferably at most 17%. When $Ga_2O_3$ is contained, its content is preferably at least 0.1%. It is more preferably at least 2%.

The total content Of $WO_3$, $TeO_2$ and $Ga_2O_3$ is preferably from 0.1 to 30%. If it is less than 0.1%, $\Delta\lambda$ is likely to be too small. It is more preferably at least 1%, particularly preferably at least 2%, most preferably at least 4%. If it exceeds 30%, the optical amplification gain is likely to decrease. It is more preferably at most 27%, particularly preferably at most 25%.

$Al_2O_3$ is not essential, but may be contained up to 10% in order to suppress precipitation of crystals during the preparation of glass thereby to facilitate vitrification or to suppress devitrification during forming. If its content exceeds 10%, the optical amplification gain is likely to decrease. It is more preferably at most 9%, particularly preferably at most 8%. When $Al_2O_3$ is contained, its content is preferably at least 0.1%. It is more preferably at least 1%, particularly preferably at least 5.1%, most preferably at least 6%.

It is preferred that at least one of $Ga_2O_3$ and $Al_2O_3$ is contained, and their total content is from 2 to 30%. If it is less than 2%, the glass is likely to be devitrified during forming. It is more preferably at least 4%, particularly preferably at least 7%. If it exceeds 30%, the optical amplification gain is likely to decrease. It is more preferably at most 25%, particularly preferably at most 20%.

The optical amplifying glass of the present invention consists essentially of the above described components, but may contain components other than the above described components in a total of up to 10%. For example, in order to suppress devitrification during forming or to facilitate vitrification, it may contain, for example, BeO, MgO, CaO, SrO, BaO, $Na_2O$, $O_2O$, $Cs_2O$, $La_2O_3$, ZnO, CdO, $In_2O_3$, $GeO_2$ or PbO.

In a first preferred Embodiment of the optical amplifying glass of the present invention, the matrix glass substantially comprises, as represented by mol %:

| | |
|---|---|
| $Bi_2O_3$ | 20 to 70, |
| $B_2O_3$ | 0 to 14.99, |
| $SiO_2$ | 15 to 79.99, and |
| $CeO_2$ | 0.01 to 10. |

The above matrix glass may contain components other than the above four components in a total of up to 10 mol %.

In a second preferred Embodiment of the optical amplifying glass of the present invention, the matrix glass substantially comprises, as represented by mol %:

| | |
|---|---|
| $Bi_2O_3$ | 30 to 80, |
| $B_2O_3$ | 15 to 69, |
| $SiO_2$ | 0 to 50, |
| $CeO_2$ | 0.01 to 10, |
| $Li_2O$ | 0 to 50, |
| $TiO_2$ | 0 to 50, |
| $ZrO_2$ | 0 to 50, and |
| $SnO_2$ | 0 to 50, | with the proviso that the total content of $SiO_2$, $Li_2O$, $TiO_2$, $ZrO_2$ and $SnO_2$ in said matrix glass is from 0 mol % to 50 mol %.

In a more preferred Embodiment 2A in the second preferred Embodiment, the matrix glass substantially comprises, as represented by mol %:

| | |
|---|---|
| $Bi_2O_3$ | 30 to 80, |
| $B_2O_3$ | 15 to 40, |
| $SiO_2$ | 0 to 50, |
| $CeO_2$ | 0.01 to 10, |
| $Li_2O$ | 0 to 50, |
| $TiO_2$ | 0 to 50, |
| $ZrO_2$ | 0 to 50, and |
| $SnO_2$ | 0 to 50, | with the proviso that the total content of $SiO_2$, $Li_2O$, $TiO_2$, $ZrO_2$ and $SnO_2$ in said matrix glass is from 2 mol % to 50 mol %.

This "more preferred Embodiment 2A" is characterized in that it is thereby possible to provide an optical amplifying glass whereby $\Delta\lambda$ is at least 80 nm, and the peak value of the after-mentioned light-emitting intensity corresponding to the gain is at least 6 i.e. the gain is large.

In another more preferred Embodiment 2B in the second preferred embodiment, the matrix glass substantially comprises, as represented by mol %:

| | |
|---|---|
| $Bi_2O_3$ | 30 to 59, |
| $B_2O_3$ | more than 40 to 69, |
| $SiO_2$ | 0 to less than 29.9, |
| $CeO_2$ | 0.01 to 10, |
| $Li_2O$ | 0 to less than 29.9, |
| $TiO_2$ | 0 to less than 29.9, |
| $ZrO_2$ | 0 to less than 29.9, and |
| $SnO_2$ | 0 to less than 29.9, | with the proviso that the total content of $SiO_2$, $Li_2O$, $TiO_2$, $ZrO_2$ and $SnO_2$ in said matrix glass is from 0 mol % to less than 29.9 mol %.

This "more preferred embodiment 2B" is characterized in that it is thereby possible to provide an optical amplifying glass having a large $\Delta\lambda$, wherein $\Delta\lambda$ is at least 90 nm, and the peak value of the light-emitting intensity is at least 5.

The matrix glass in the second preferred Embodiment consists essentially of the above eight components and may contain components other than the above components in a total of up to 10 mol %. Within this limitation, for example, MgO, ZnO, BaO and $Al_2O_3$ may be incorporated in a total of up to 10 wt %. Here, the total content of the above eight components is taken as 100 wt %.

In a third preferred Embodiment of the optical amplifying glass of the present invention, the matrix glass substantially comprises, as represented by mol %:

| | |
|---|---|
| $Bi_2O_3$ | 25 to 70, |
| $B_2O_3$ | 0 to 74.89, |
| $SiO_2$ | 0 to 74.89, |
| $CeO_2$ | 0.01 to 10, |
| $WO_3$ | 0 to 30, |
| $TeO_2$ | 0 to 30, and |
| $Ga_2O_3$ | 0 to 30, | with the proviso that in said matrix glass, the total content of $B_2O_3$ and $SiO_2$ is from 5 mol % to 74.89 mol %, and the total content of $WO_3$, $TeO_2$ and $Ga_2O_3$ is from 0.1 mol % to 30 mol %. Components other than the above seven components may be contained in a total of up to 5 mol %, and MgO, BaO, ZnO and $Al_2O_3$ may be exemplified as such other components.

In a fourth preferred Embodiment of the optical amplifying glass of the present invention, the matrix glass substantially comprises, as represented by mol %:

| | |
|---|---|
| $Bi_2O_3$ | 25 to 70, |
| $B_2O_3$ | 0 to 74.79, |
| $SiO_2$ | 0 to 74.79, |
| $CeO_2$ | 0.01 to 10, |
| $WO_3$ | 0 to 30, |
| $TeO_2$ | 0 to 30, |
| $Ga_2O_3$ | 0 to 30, and |
| $Al_2O_3$ | 0.1 to 10, | with the proviso that in said matrix glass, the total content of $B_2O_3$ and $SiO_2$ is from 5 mol % to 74.79 mol %, and the total content of $WO_3$, $TeO_2$ and $Ga_2O_3$ is from 0.1 mol % to 30 mol %. Components other than the above eight components may be contained in a total of up to 5 mol %. For example, MgO, BaO, ZnO, etc., may be incorporated to suppress crystallization during the preparation of glass thereby to facilitate formation of glass.

In the third or fourth preferred Embodiment of the optical amplifying glass of the present invention, in addition to Bi ions, at least one member selected from W ions, Te ions and Ga ions, which are also heavy element ions, is contained. Accordingly, the light-electric field interaction in the glass increases, and consequently, the contribution of the electric dipole transition which is essentially a broad transition, becomes large, whereby the possibility of light emission within a wider wavelength range tends to be high.

With respect to the method for the preparation of the optical amplifying glass of the present invention, there is no particular limitation. For example, the optical amplifying glass of the present invention can be prepared by a melting method wherein the starting materials are mixed and put into a platinum crucible, an alumina crucible, a quartz crucible or an iridium crucible, followed by melting at a temperature of from 800 to 1300° C. in air, and the obtained melt (molten glass) is cast in a predetermined mold. Otherwise, the optical amplifying glass of the present invention may be prepared by a method other than the melting method, such as a sol gel method or a gas phase vapor deposition method.

Now, the optical amplifying medium and the resin-coated optical amplifying medium of the present invention will be described.

The optical amplifying medium of the present invention comprises a core glass and a clad glass covering it, and it takes a form of e.g. a glass fiber or a waveguide. When it is used as a single mode optical amplifying glass fiber, its cross-sectional shape is usually circular, and when it is used as a single mode optical amplifying waveguide, its cross-sectional shape is usually square.

Figure 6:
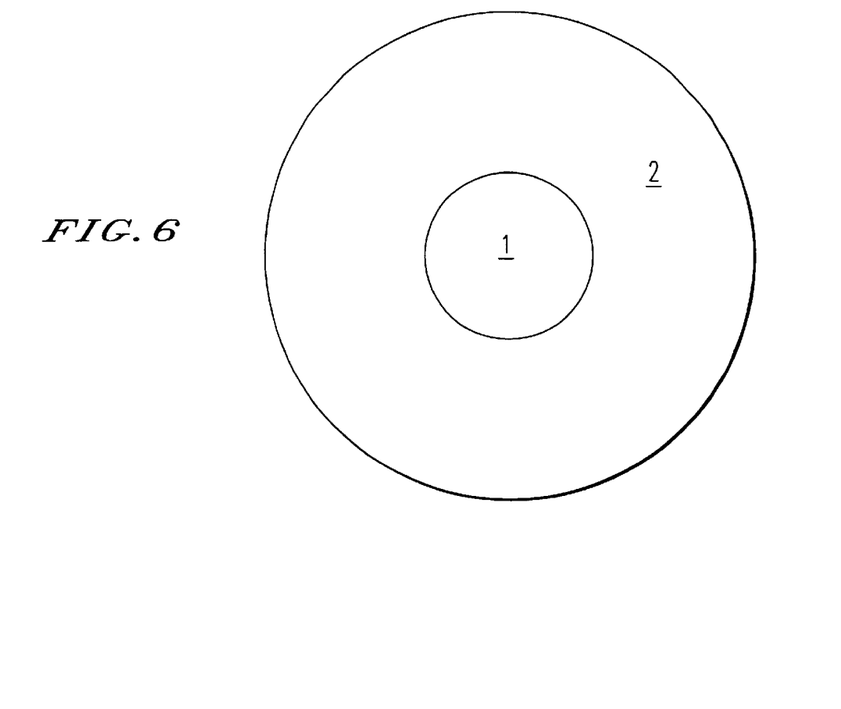
FIG. 6 is a view showing an example of the cross-sectional shape of an optical amplifying glass fiber.
Figure 7:
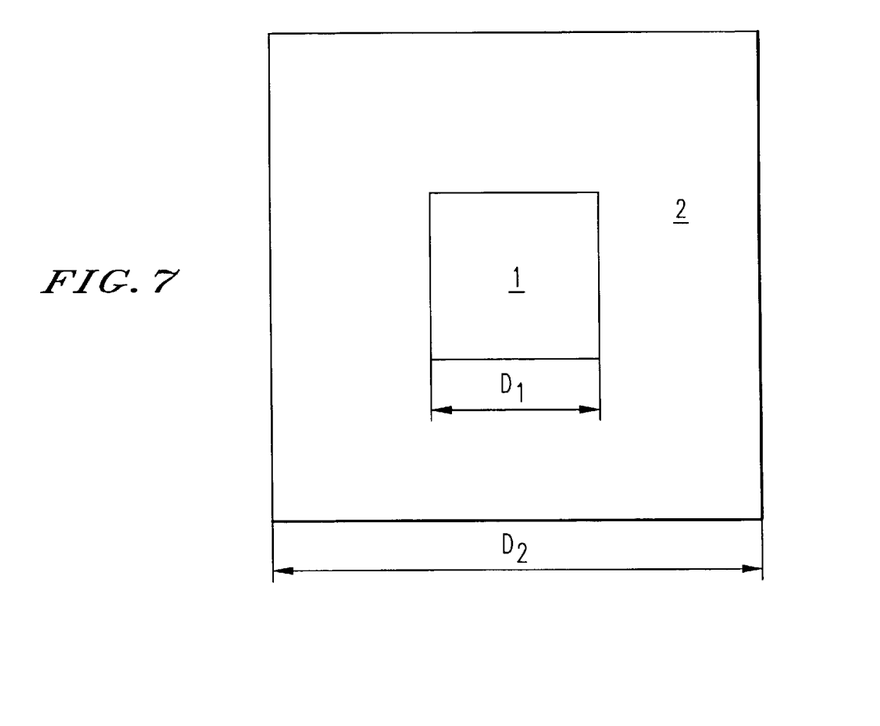
FIG. 7 is a view showing an example of the cross-sectional shape of an optical amplifying waveguide.

FIG. 6 shows an example of an optical amplifying glass fiber, and FIG. 7 shows an example of the cross-sectional shape of an optical amplifying waveguide. In each case, a core glass is covered with a clad glass 2.

In the optical amplifying glass fiber, the diameter of the core glass 1 (this diameter will be hereinafter referred to as $d_1$) is preferably from 1 to 12 μm, and the diameter of the clad glass 2 (this diameter will be hereinafter referred to as $d_2$) is preferably from 40 to 200 μm.

If $d_1$ is less than 1 μm, $d_1/d_2$ tends to be too small, whereby fiber-forming tends to be difficult. It is more preferably at least 1.2 μm, particularly preferably at least 2 μm. If $d_1$ exceeds 12 μm, it is likely to be difficult to transmit light with a wavelength of from 1.45 to 1.64 μm by a single mode system. It is preferably at most 10 μm, more preferably at most 9 μm.

If $d_2$ is less than 40 μm, fiber forming or handling is likely to be difficult. It is preferably at least 45 μm, particularly preferably at least 80 μm. If $d_2$ exceeds 20 μm, the glass fiber is likely to be hardly bent, or handling is likely to be difficult. It is more preferably at most 150 μm. Further, $d_2$ is particularly preferably within a range of from 122 to 128 μm which meets the standards for optical fibers for communication.

In the optical amplifying waveguide, the side length $D_1$ of the core glass 1 is preferably from 1 to 12 μm, and the side length $D_2$ of the clad glass 2 is preferably from 20 to 200 μm.

If $D_1$ is less than 1 μm, $D_1/D_2$ tends be too small, whereby the preparation of the waveguide is likely to be difficult, or connection to other optical members such as optical fibers, is likely to be difficult. It is preferably at least 2 μm. If $D_1$ exceeds 12 μm, it is likely to be difficult to transmit light with a wavelength of from 1.45 to 1.64 μm by a single mode system. It is preferably at most 10 μm.

If $D_2$ is less than 20 μm, the preparation or handling of the waveguide is likely to be difficult. It is preferably at least 30 μm. If $D_2$ exceeds 200 μm, $D_1/D_2$ tends be too small, whereby the preparation of the waveguide is likely to be difficult. It is more preferably at most 150 μm.

In the optical amplifying medium of the present invention, a relation represented by the following formula is satisfied between the refractive index $n_1$ of the core glass to light with a wavelength of 1.55 μm and the refractive index $n_2$ of the clad glass to light with a wavelength of 1.55 μm.

$$0.0005 \leq (n_1-n_2)/n_1 \leq 0.1$$

If $(n_1-n_2)/n_1$ (hereinafter referred to as $\Delta n/n$) is less than 0.0005, it tends to be difficult to confine the light within the core glass. It is preferably at least 0.001, more preferably at least 0.003. If it exceeds 0.1, it tends to be difficult to transmit light in the optical amplifying medium by a single mode system. It is preferably at most 0.08, more preferably at most 0.05.

The refractive index distribution in the cross section of the core glass may not necessarily be uniform, and it may be a non-uniform distribution in order to obtain desired waveguide characteristics. In such a case, the above-mentioned $n_1$ is the maximum value of the refractive index within the cross section of the core glass.

The glass transition point of the core glass is preferably at least 360° C. The reason is such that when a laser beam having a high intensity is used as a pumping light for optical amplification, the temperature of the core glass is likely to be locally high, and if the glass transition point is less than 360° C., the core glass is likely to be thermally damaged, and consequently, the optical loss will increase, and the optical amplification is likely to be inadequate. It is more preferably at least 380° C., still more preferably at least 400° C., particularly preferably at least 410° C.

The core glass is an optical amplifying glass having Er added to the matrix glass, and the amount of Er added is from 0.01 to 10 wt %. If it is less than 0.01 wt %, the optical amplification tends to be inadequate, particularly, the optical amplification gain tends to be low. It is preferably at least 0.1 wt %, more preferably at least 0.2 wt %. If it exceeds 10 wt %, vitrification tends to be difficult, or optical quenching by concentration tends to occur, whereby the optical amplification tends to be inadequate, particularly, the optical amplification gain tends to be inadequate. It is preferably at most 8 wt %, more preferably at most 6 wt %.

The concentration distribution of Er in the core glass may be uniform, but it may be such a distribution that the Er concentration becomes high at the center portion of the core glass in order to efficiently utilize a high intensity portion of the pumping light for pumping of Er.

The compositions of the above-mentioned matrix glass and the clad glass are determined to satisfy the above-mentioned relation between $n_1$ and $n_2$. However, it is preferred that the compositions of the two are substantially the same. Nevertheless, the compositions of the two must be different from each other, since the above relation between $n_1$ and $n_2$ will not be satisfied if the compositions of the two are exactly the same.

The above matrix glass contains $Bi_2O_3$ within a range of from 20 to 80 mol %. If it is less than 20 mol %, the desired optical amplification i.e. the desired broad band amplification characteristics, can hardly be obtainable. It is preferably at least 25%, more preferably at least 30 mol %, particularly preferably at least 38%. If it exceeds 80 mol %, vitrification tends to be difficult, or devitrification will take place during forming, or the glass transition point tends to be too low. Preferably, it is at most 70 mol %, more preferably at most 65 mol %, particularly preferably at most 60 mol %.

Further, the matrix glass contains at least one of $B_2O_3$ and $SiO_2$. In such a case, only $B_2O_3$ may be contained without containing $SiO_2$, or only $SiO_2$ may be contained without containing $B_2O_3$, or both $B_2O_3$ and $SiO_2$ may be contained. If neither $B_2O_3$ nor $SiO_2$ is contained, vitrification tends to be difficult.

Further, the matrix glass contains $CeO_2$ within a range of from 0.01 mol % to 10 mol %. $CeO_2$ has an effect to suppress reduction of $Bi_2O_3$ in the glass composition during the glass melting to precipitate metal bismuth and to lower the transparency of the glass. If the content of $CeO_2$ is less than 0.01%, its effect tends to be inadequate. It is preferably at least 0.1%, more preferably at least 0.15%. If it exceeds 10%, vitrification tends to be difficult. It is preferably at most 5%, more preferably at most 1%, particularly preferably at most 0.5%.

The above core glass is preferably an optical amplifying glass of the present invention.

Now, the clad glass in the optical amplifying medium of the present invention will be described.

It is not essential but preferred that the above clad glass contains $Bi_2O_3$ within a range of from 25 mol % to 80 mol %. If it is less than 25 mol %, the content of $Bi_2O_3$ in the core glass is required to be small, whereby the optical amplification is likely to be inadequate. It is more preferably at least 30 mol %, more preferably at least 38%. If it exceeds 80 mol %, vitrification is likely to be difficult, or devitrification is likely to occur during forming. It is preferably at most 70 mol %, more preferably at most 65 mol %, particularly preferably at most 60 mol %.

Further, it preferably contains at least one of $B_2O_3$ and $SiO_2$. In such a case, only $B_2O_3$ may be contained without containing $SiO_2$, or only $SiO_2$ may be contained without containing $B_2O_3$, or both $B_2O_3$ and $SiO_2$ may be contained. If neither $B_2O_3$ nor $SiO_2$ is contained, vitrification tends to be difficult.

It is not essential but preferred that the above clad glass contains $CeO_2$ within a range of from 0.01 mol % to 10 mol %. $CeO_2$ has an effect to suppress reduction of $Bi_2O_3$ in the glass composition during the glass melting to precipitate metal bismuth and thereby to lower the transparency of the glass. If the content of $CeO_2$ is less than 0.01%, its effect tends to be inadequate. It is more preferably at least 0.1%, particularly preferably at least 0.15%. If it exceeds 10%, vitrification tends to be difficult. It is more preferably at most 5%, particularly preferably at most 1%, most preferably at most 0.5%.

More preferably, the above clad glass substantially comprises, as represented by mol %:

| | |
|---|---|
| $Bi_2O_3$ | 20 to 80, |
| $B_2O_3$ | 0 to 74.89, |
| $SiO_2$ | 0 to 79.99, |
| $CeO_2$ | 0.01 to 10, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |
| $Ga_2O_3$ | 0 to 30, and |
| $Al_2O_3$ | 0 to 30. |

Further, it is more preferred that the total content of $B_2O_3$ and $SiO_2$ is from 5 mol % to 74.79 mol %, particularly preferably from 30 mol % to 70 mol %, most preferably from 40 mol % to 60 mol %. Further, it is more preferred that at least one of $Ga_2O_3$ and $Al_2O_3$ is contained, and their total content is from 0.1 mol % to 30 mol %, particularly preferably from 2 mol % to 20 mol %. In these "more preferred Embodiments" the clad glass consists essentially of the above twelve components, but it may contain other components within a range of at most 10% in total. For example, it may contain BeO, MgO, CaO, SrO, $Li_2O$, $Na_2O$, $K_2O$, $Cs_2O$, $La_2O_3$, $TiO_2$, $ZrO_2$, CdO, $In_2O_3$, $GeO_2$, PbO, etc., in order to suppress devitrification during forming or in order to facilitate vitrification.

In the optical amplifying medium of the present invention, the compositions of the core glass and the clad glass are determined preferably not only to satisfy the above-mentioned relation between $n_1$ and $n_2$ but also to coordinate the thermal expansion coefficients of the two.

The resin-coated optical amplifying medium of the present invention is one having the optical amplifying medium of the present invention coated with a resin in order to increase the breaking strength.

The thickness of the resin is preferably within a range of from 2 to 400 $\mu$m. If it is less than 2 $\mu$m, no adequate effect for increasing the breaking strength is likely to be obtained. It is more preferably at least 3 $\mu$m, particularly preferably at least 8 $\mu$m. If it exceeds 400 $\mu$m, a uniform resin coating is likely to be difficult. It is more preferably at most 70 $\mu$m.

The above resin is not particularly limited so long as it has good adhesion to the clad glass, and it is easy to cover the clad glass with it.

Further, the refractive index of the resin is preferably larger than the refractive index of the clad glass in order to suppress clad mode propagation of light, and the absorption coefficient of the resin for light with a wavelength of from 1.45 to 1.64 $\mu$m, is preferably large.

Further, the Young's modulus of the above resin is preferably at least 1 MPa. If it is less than 1 MPa, the resin tends to be easily damaged, whereby the breaking strength may not be made high. It is more preferably at least 4.9 MPa, particularly preferably at least 98 MPa.

As the above resin, a thermosetting silicone resin, a UV-curable silicone resin, an acrylic resin, an epoxy resin or a polyimide resin may, for example, be mentioned.

The optical amplifying medium of the present invention can be prepared, for example, as follows. The starting materials are mixed, put into a platinum crucible, an alumina crucible, a quartz crucible or an iridium crucible and melted at a temperature of from 800 to 1300° C. in air, and the obtained melt is cast in a mold to obtain a glass for core and a glass for clad.

To prepare an optical amplifying glass fiber, the glass for core and the glass for clad are overlaid and subjected to extrusion molding at a temperature of from 400 to 500° C. to obtain a preform having a core/clad structure.

To prepare an optical amplifying waveguide, the above-mentioned glass for core is formed to have a rectangular parallelpiped shape, and the core glass is inserted into a glass for clad having a hole to snuggly receive the glass for core, to obtain a preform having a core/clad structure.

The preform thus obtained is put into an electric furnace of about 500° C., e.g. from 450° C. to 550° C., and softened and shaped while controlling to obtain a desired size, to obtain an optical amplifying medium.

The resin-coated optical amplifying medium of the present invention can be prepared, for example, by coating the optical amplifying medium obtained as described above, with a UV-curable resin, followed by UV irradiation. Otherwise, it may be prepared by coating the optical amplifying medium obtained as described above, with a thermosetting resin, followed by heating at a temperature of from 50 to 200° C.

The optical amplifying medium of the present invention and the resin-coated optical amplifying medium of the present invention are useful for an optical amplifier. As such an optical amplifier, a WDM-complied light amplifier or a laser apparatus, may, for example, be mentioned.

The light amplifier may, for example, have the following construction. A signal light source is connected to a wave combining optical coupler via an optical isolator. To the optical coupler, a pumping light source is also connected. The optical coupler is connected to one end of an optical amplifying glass fiber. The other end of the optical amplifying glass fiber is connected to an optical isolator via a wave branching optical coupler. The respective components are connected by an optical fiber.

Whereas, the laser apparatus, may, for example, has the following construction. A pumping light source is connected to an optical coupler. To the optical coupler, light passed through the after-mentioned narrow-band-pass filter, is also permitted to enter. The optical coupler is connected to one end of an optical amplifying glass fiber. The other end of the optical amplifying glass fiber is connected to an optical isolator. And, light passed through the optical isolator is led to the narrow-band-pass filter and is again led to the above-mentioned optical coupler as described above. Namely, a ring-like optical resonator is formed by the optical coupler, the optical amplifying medium, the optical isolator and the narrow-band-pass filter. Further, the respective components are connected by an optical fiber.

Now, the present invention will be described in further detail with reference to Examples. However, it should be understood that the present invention is by no means restricted to such specific Examples.

In Tables 1 to 6, the compositions and the characteristics of the optical amplifying glasses of the present invention are shown.

The compositions are shown in lines for $Bi_2O_3$ to Er in the Tables. With respect to Er, the amount added is shown by wt %, and with respect to other components, the respective amounts are shown by mol %.

As regards the characteristics, the glass transition point ($T_g$, unit: ° C.) as measured by a differential thermal analysis (DTA), the light-emitting intensity peak value ($I_p$, arbitrary unit), the wavelength width within which the gain is obtainable ($\Delta\lambda$, unit: nm), and the devitrification (D) which will be described hereinafter, are shown. With respect to $T_g$, $I_p$ and D, the measurements or evaluation was made with respect to some of the optical amplifying glasses only.

Devitrification: An optical amplifying glass was formed into a preform, which was formed into a fiber at 550° C. the surface of the obtained glass fiber was observed by an optical microscope, whereby a case where no precipitation of crystals was observed, was identified by symbol ○, and a case where certain precipitation of crystals was observed, was identified by symbol Δ.

Figure 1:
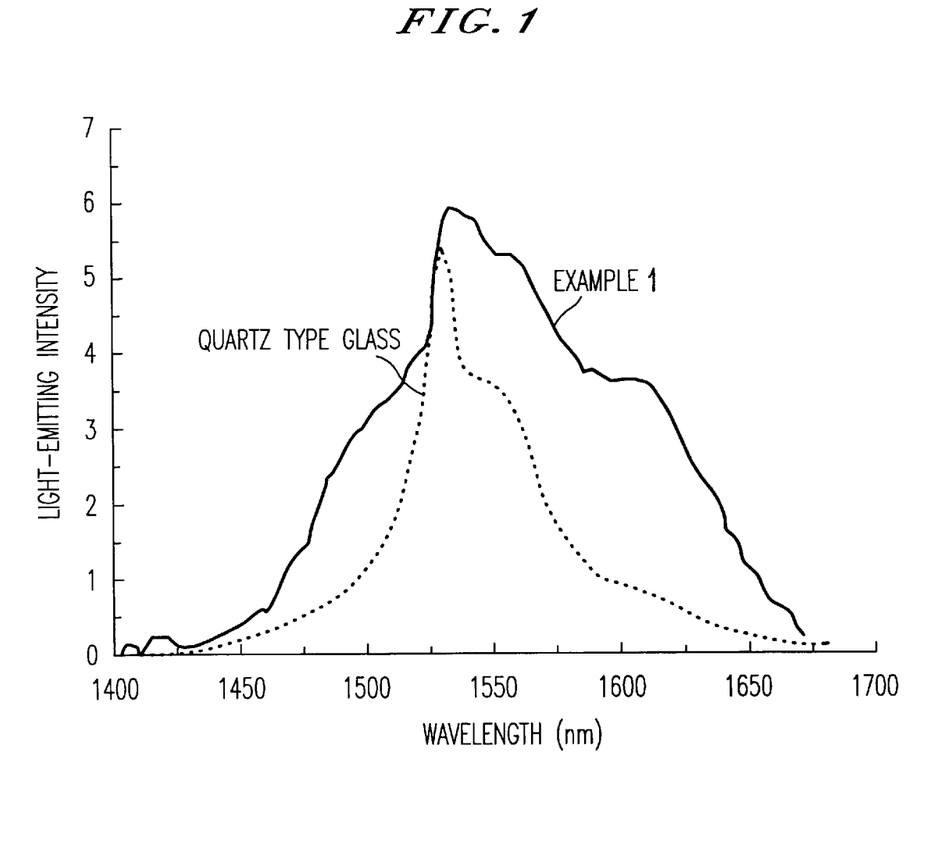
FIGS. 1, 2, 3 and 4 are graphs showing emission spectra of optical amplifying glasses of the present invention and a conventional quartz type glass (Er-doped quartz type glass).

Examples 1 to 5 in Table 1 represent Examples of the first preferred Embodiment of the optical amplifying glass of the present invention. FIG. 1 shows a comparison of the wavelength dependency of the light-emitting intensity in the light emission from the upper level of the $^4I_{13/2}$ level to the lower level of the $^4I_{15/2}$ level of $Er^{3+}$ ions in the optical amplifying glass of Example 1 and the wavelength dependency of the light-emitting intensity in the similar light emission of $Er^{3+}$ ions in a conventional quartz type glass (an Er-doped quartz type glass). The unit of the light-emitting intensity is an arbitrary unit.

It is known that in FIG. 1, the gain is obtainable when the light-emitting intensity is at least 2.5. The wavelength range wherein the gain is obtainable, is from 1520 to 1560 nm in the case of the quartz type glass, whereby $\Delta\lambda$ is 40 nm. Whereas, in the case of the optical amplifying glass of Example 1, the gain is obtainable within a range of from 1480 to 1620 nm, whereby $\Delta\lambda$ is 140 nm. Namely, $\Delta\lambda$ of the optical amplifying glass of Example 1 is as high as 3.5 times of $\Delta\lambda$ of the quartz type glass.

Also, $\Delta\lambda$ of the optical amplifying glasses of Examples 2 to 5 was about 3.5 times of $\Delta\lambda$ of the quartz type glass.

TABLE 1

|  | Example 1 | Example 2 | Example 3 | Example 4 | Example 5 |
|---|---|---|---|---|---|
| $Bi_2O_3$ | 65 | 60 | 41.85 | 40 | 30 |
| $B_2O_3$ | 14.5 | 9.8 | 10 | 0 | 0.2 |
| $SiO_2$ | 20.4 | 30 | 48 | 59.8 | 69.4 |
| $CeO_2$ | 0.1 | 0.2 | 0.15 | 0.2 | 0.4 |
| Er | 0.4 | 0.4 | 0.4 | 0.4 | 0.4 |
| $T_g$ | — | — | 418 | 420 | 450 |
| $\Delta\lambda$ | 140 | 138 | 135 | 138 | 135 |

Figure 2:
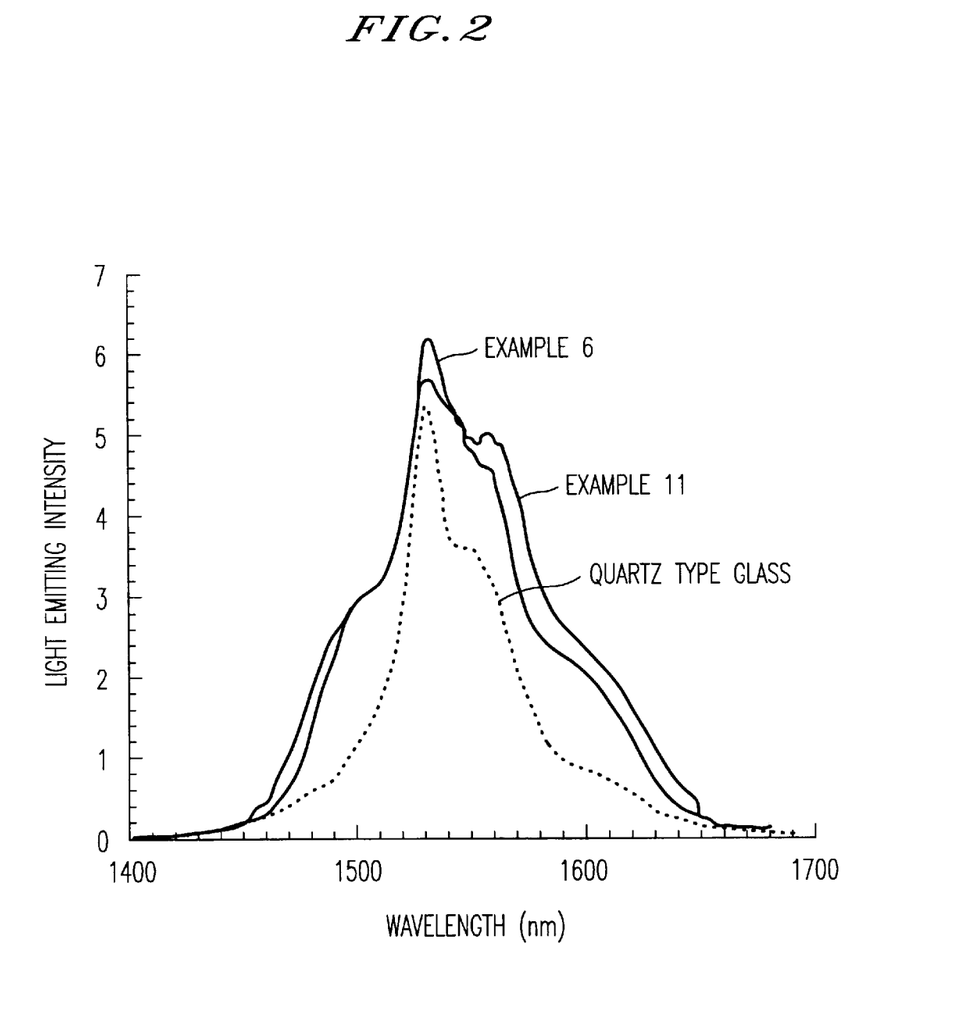

Examples 6 to 15 shown in Tables 2 and 3 represent Examples of the second preferred Embodiment of the optical amplifying glass of the present invention. Examples 6 to 10 represent Examples of the more preferred Embodiment 2A. Examples 11 to 15 represent Examples of the more preferred Embodiment 2B. FIG. 2 shows a comparison of the wavelength dependency of the light-emitting intensity in the light emission from the upper level of the $^4I_{13/2}$ level to the lower level of the $^4I_{15/2}$ level of $Er^{3+}$ ions in the optical amplifying glasses of Examples 6 and 11 and the wavelength dependency of the light-emitting intensity in the similar light emission of $Er^{3+}$ ions in a conventional quartz type glass (an Er-doped quartz type glass). The unit of the light-emitting intensity is an arbitrary unit.

It is known that in FIG. 2, the optical amplification gain can be obtained when the light-emitting intensity is at least 2.5. The light-emitting intensity peak value $I_p$ of the optical amplifying glass of Example 6 is 6.2, and $I_p$ of the optical amplifying glass of Example 11 is 5.7, and the gain is obtainable in either case. On the other hand, $I_p$ of the quartz type glass is 5.4.

The wavelength range wherein the gain is obtainable, is from 1480 to 1580 nm in the case of the optical amplifying glass of Example 5, whereby $\Delta\lambda$ is 100 nm. In the case of the optical amplifying glass of Example 11, the gain is obtainable from 1480 to 1600 nm, whereby $\Delta\lambda$ is 120 nm. $\Delta\lambda$ of the optical amplifying glasses of Examples 6 and 11 is as high as 2.5 times and 3 times, respectively, of $\Delta\lambda$ of the quartz type glass.

Also with respect to the optical amplifying glasses of Examples 7 to 10 and Examples 12 to 15, $I_p$ and $\Delta\lambda$ were measured. The results of the measurements are shown in the Tables together with the results in Examples 6 and 11. $\Delta\lambda$ of the optical amplifying glasses of Examples 7 to 10, was about 2.5 times of $\Delta\lambda$ of the quartz type glass, and $\Delta\lambda$ of the optical amplifying glasses of Examples 12 to 15 was about 3 times of $\Delta\lambda$ of the quartz type glass.

Further, $I_p$ of the optical amplifying glasses of Examples 6 to 10 is at least 6.1, and a large gain is obtainable as compared with the quartz type glass.

TABLE 2

|  | Example 6 | Example 7 | Example 8 | Example 9 | Example 10 |
|---|---|---|---|---|---|
| $Bi_2O_3$ | 42.6 | 49.5 | 65 | 67 | 74 |
| $B_2O_3$ | 28.5 | 25 | 29.5 | 25 | 15.8 |
| $SiO_2$ | 28.5 | 5 | 0 | 0 | 0 |
| $CeO_2$ | 0.4 | 0.5 | 0.5 | 0.2 | 0.2 |
| $Li_2O$ | 0 | 0 | 0 | 0 | 3 |
| $TiO_2$ | 0 | 0 | 0 | 7.8 | 7 |
| $ZrO_2$ | 0 | 0 | 5 | 0 | 0 |
| $SnO_2$ | 0 | 20 | 0 | 0 | 0 |
| Er | 0.4 | 0.4 | 0.4 | 0.4 | 0.4 |
| $T_g$ | 420 | 410 | 380 | 365 | 360 |
| $I_p$ | 6.2 | 6.4 | 6.1 | 6.2 | 6.9 |
| $\Delta\lambda$ | 100 | 102 | 103 | 102 | 100 |

TABLE 3

|  | Example 11 | Example 12 | Example 13 | Example 14 | Example 15 |
|---|---|---|---|---|---|
| $Bi_2O_3$ | 43 | 50 | 31 | 41 | 34.6 |
| $B_2O_3$ | 56.9 | 41 | 60 | 55 | 40 |
| $SiO_2$ | 0 | 7.8 | 8.85 | 3.8 | 25 |
| $CeO_2$ | 0.1 | 0.2 | 0.15 | 0.2 | 0.4 |
| $Li_2O$ | 0 | 0 | 0 | 0 | 0 |
| $TiO_2$ | 0 | 0 | 0 | 0 | 0 |
| $ZrO_2$ | 0 | 0 | 0 | 0 | 0 |
| $SnO_2$ | 0 | 0 | 0 | 0 | 0 |
| Er | 0.4 | 0.4 | 0.4 | 0.4 | 0.4 |
| $T_g$ | 420 | 105 | 435 | 425 | 430 |
| $I_p$ | 5.7 | 5.3 | 5.1 | 5.2 | 5.7 |
| $\Delta\lambda$ | 120 | 121 | 125 | 123 | 120 |

Figure 3:
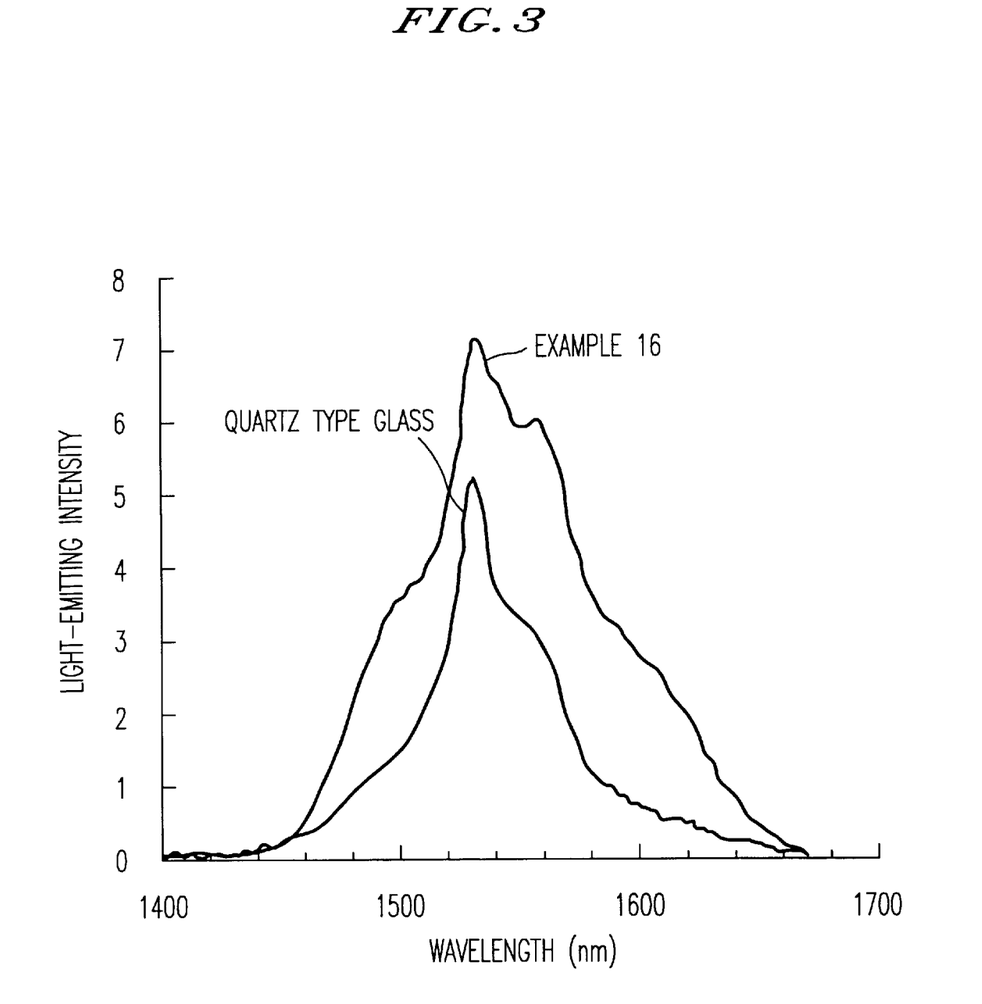

Examples 16 to 27 shown in Tables 4 and 5 represent Examples of the third preferred Embodiment of the optical amplifying glass of the present invention. FIG. 3 shows a comparison of the wavelength dependency of the light-emitting intensity in the light emission from the upper level of the $^4I_{13/2}$ level to the lower level of the $^4I_{15/2}$ level of $Er^{3+}$ ions in the optical amplifying glass of Example 16 and the wavelength dependency of the light-emitting intensity in the similar light emission of $Er^{3+}$ ions in a conventional quartz type glass (an Er-doped quartz type glass). The unit of the light-emitting intensity is an arbitrary unit.

It is known that in FIG. 3, the gain can be obtained when the light-emitting intensity is at least 2.7. The wavelength range wherein the gain is obtainable, is from 1486 to 1604 nm in the case of the optical amplifying glass of Example 16, whereby $\Delta\lambda$ is 118 nm. This $\Delta\lambda$ is as high as about 3 times of $\Delta\lambda$ of the quartz type glass.

Also with respect to the optical amplifying glasses of Examples 17 to 27, $\Delta\lambda$ was measured. The results of the measurements are shown in Tables. $\Delta\lambda$ in each case is about 3 times of $\Delta\lambda$ of the quartz type glass.

TABLE 4

|  | Example 16 | Example 17 | Example 18 | Example 19 | Example 20 | Example 21 |
|---|---|---|---|---|---|---|
| $Bi_2O_3$ | 42.8 | 44.8 | 54.8 | 34.8 | 44.8 | 62.8 |
| $B_2O_3$ | 27 | 50 | 27 | 27 | 0 | 16 |
| $SiO_2$ | 13 | 0 | 0 | 15 | 50 | 4 |
| $CeO_2$ | 0.2 | 0.2 | 0.2 | 0.2 | 0.2 | 0.2 |
| $WO_3$ | 0 | 0 | 4 | 10 | 5 | 0 |
| $TeO_2$ | 17 | 5 | 14 | 13 | 0 | 17 |
| $Ga_2O_3$ | 0 | 0 | 0 | 0 | 0 | 0 |
| Er | 0.4 | 0.4 | 0.4 | 0.4 | 0.4 | 0.4 |
| $T_g$ | 420 | 415 | 390 | 450 | 435 | 360 |
| $\Delta\lambda$ | 118 | 121 | 120 | 119 | 115 | 116 |

TABLE 5

|  | Example 22 | Example 23 | Example 24 | Example 25 | Example 26 | Example 27 |
|---|---|---|---|---|---|---|
| $Bi_2O_3$ | 42.8 | 44.8 | 54.8 | 34.8 | 44.8 | 62.8 |
| $B_2O_3$ | 27 | 50 | 27 | 27 | 0 | 16 |
| $SiO_2$ | 13 | 0 | 0 | 15 | 35 | 4 |
| $CeO_2$ | 0.2 | 0.2 | 0.2 | 0.2 | 0.2 | 0.2 |
| $WO_3$ | 0 | 0 | 4 | 10 | 5 | 0 |
| $TeO_2$ | 0 | 0 | 10 | 0 | 0 | 7 |
| $Ga_2O_3$ | 17 | 5 | 4 | 13 | 15 | 10 |
| Er | 2.0 | 0.4 | 0.4 | 0.4 | 3.0 | 0.4 |
| $T_g$ | 413 | 420 | 395 | 450 | 430 | 362 |
| $\Delta\lambda$ | 125 | 120 | 119 | 119 | 128 | 115 |
| D | $\Delta$ | — | — | — | — | — |

Figure 4:
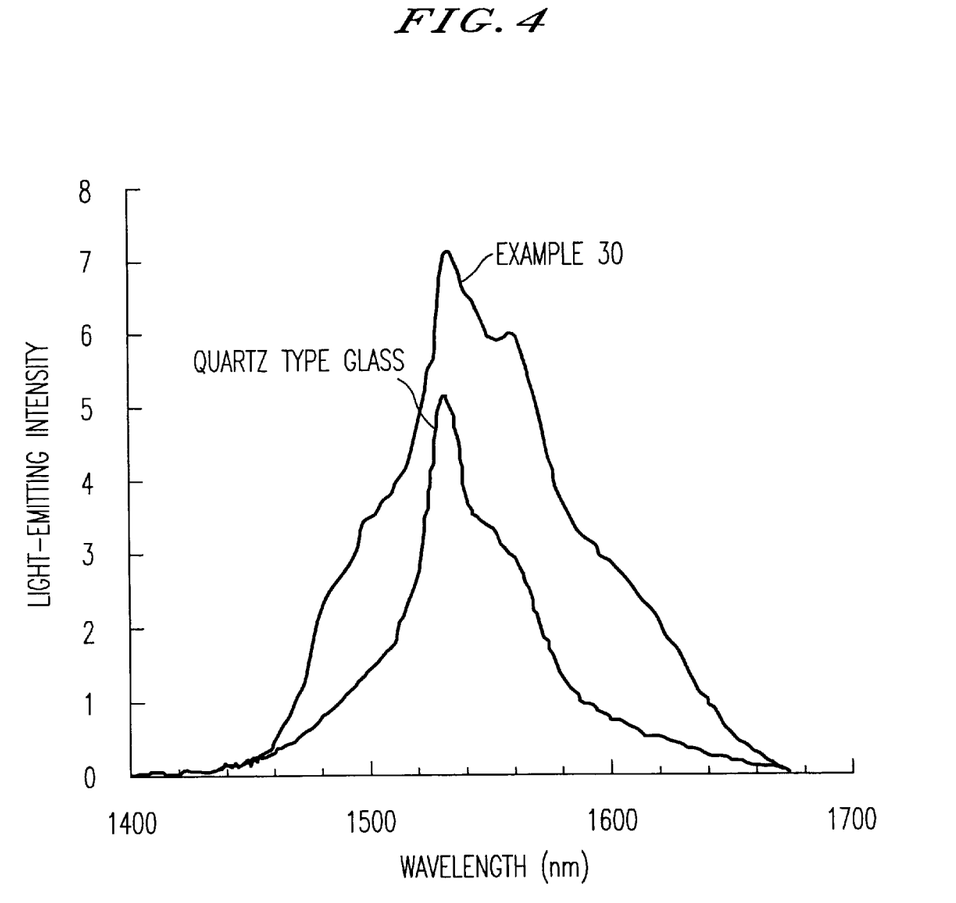

Examples 28 to 31 shown in Table 6 represent Examples of the fourth preferred Embodiment of the optical amplifying glass of the present invention. FIG. 4 shows a comparison of the wavelength dependency of the light-emitting intensity in the light emission from the upper level of the $^4I_{13/2}$ level to the lower level of the $^4I_{15/2}$ level of $Er^{3+}$ ions in the optical amplifying glass of Example 30 and the wavelength dependency of the light-emitting intensity in the similar light emission of $Er^{3+}$ ions in a conventional quartz type glass (an Er-doped quartz type glass). The unit of the light-emitting intensity is an arbitrary unit.

It is known that in FIG. 4, the gain can be obtained when the light-emitting intensity is at least 2.7. The wavelength range wherein the gain is obtainable, is from 1487 to 1610 nm in the case of the optical amplifying glass of Example 30, whereby $\Delta\lambda$ is 123 nm. This $\Delta\lambda$ is as high as about 3 times of $\Delta\lambda$ of the quartz type glass.

$\Delta\lambda$ of Examples 28, 29 and 31 is also shown in the Table, and $\Delta\lambda$ in each case is about 3 times of $\Delta\lambda$ of the quartz type glass.

Further, the optical amplifying glasses of Examples 28 to 31 are excellent in the fiber forming property, as no precipitation of crystals is observed during fiber processing. With the optical amplifying glass of the above described Example 22 which does not belong to the fourth preferred Embodiment, precipitation of crystals during the fiber processing was slightly observed.

TABLE 6

|  | Example 28 | Example 29 | Example 30 | Example 31 |
|---|---|---|---|---|
| $Bi_2O_3$ | 42.8 | 44.7 | 42.8 | 54.8 |
| $B_2O_3$ | 27 | 0 | 27 | 24 |
| $SiO_2$ | 13 | 30 | 6 | 0 |

TABLE 6-continued

|  | Example 28 | Example 29 | Example 30 | Example 31 |
|---|---|---|---|---|
| $CeO_2$ | 0.2 | 0.2 | 0.2 | 0.2 |
| $WO_3$ | 0 | 5 | 0 | 4 |
| $TeO_2$ | 0 | 0 | 17 | 14 |
| $Ga_2O_3$ | 10 | 15 | 0 | 0 |
| $Al_2O_3$ | 7 | 5.1 | 7 | 3 |
| Er | 2.0 | 3.0 | 0.4 | 0.4 |
| $T_g$ | 414 | 428 | 422 | 391 |
| ΔΛ | 123 | 125 | 116 | 118 |
| D | ○ | ○ | ○ | ○ |

Examples of the optical amplifying medium of the present invention are shown in Tables 7 and 8.

The core glasses and the clad glasses having the compositions shown in lines for from $Bi_2O_3$ to Er in the Tables, were prepared. The amounts in lines from $Bi_2O_3$ to $Al_2O_3$ are represented by mol %, and the amount of Er is represented by wt %, based on the glass being 100 wt %.

With respect to these glasses, the glass transition points $T_g$ were measured by a differential thermal analysis (DTA). The results are shown in line for $T_g$ in the Tables (unit: °C.). The one identified with * is an assessed value obtained by calculation from the composition.

Further, refractive indices of these core glasses and clad glasses to light with a wavelength of 1.55 μm, were measured by an ellipsometer. The results are shown in the line for $n_1$, and $n_2$, and the value of $(n_1-n_2)/n_1$ is shown in the line for Δn/n. The one identified with * is an assessed value obtained by calculation from the composition.

With respect to Examples 32 to 34, a preform having a core/clad structure was prepared from the core glass and the clad glass, and this preform was subjected to fiber processing at a temperature of 525° C. to obtain a glass fiber. In the line for diameter in Table 7, the diameters of the core glass and the clad glass are shown (unit: μm).

With respect to Example 32, the above glass fiber is further coated with a UV-curable acrylic resin and subjected to UV-irradiation to prepare a resin-coated glass fiber having a diameter of 250 μm. The thickness of the resin was 62.5 μm. Further, the Young's modulus of the resin was 1130 MPa.

The above resin-coated glass fiber having a length of 6 cm was prepared, and a light with a wavelength of from 1.50 to 1.59 μm (a signal light: 0.001 mW) and a pumping laser beam with a wavelength of 975 nm (50 mW) were combined by an optical wave coupler, and the combined light was introduced into this resin-coated glass fiber. From the intensity $I_{out}$ of the signal light coming out of the resin-coated glass fiber and the intensity $I_{in}$ of the incident signal light, the gain G (unit: dB) defined by the following formula was calculated with respect to this resin-coated glass fiber.

$$G=10\times\log_{10}(I_{out}/I_{in})$$

The values of such G against lights with wavelengths of 1.50, 1.53, 1.56 and 1.59 μm, were 10, 16, 14 and 9, respectively. Namely, it was confirmed that the gain was obtainable within a wavelength range of from 1.50 to 1.59 μm, and the wavelength width wherein the gain is obtainable, was found to be at least 0.09 μm (at least 90 nm).

Examples 35 to 37 are Examples for a combination of the core glass and the clad glass, suitable for an optical amplifying glass fiber. Namely, in Examples 35 to 37, not only the above-mentioned relation relating to Δn/n was satisfied, but also matching of the thermal expansion coefficients was done.

Further, the wavelength width wherein said G is positive against light with a wavelength of from 1.45 to 1.64 μm, is preferably at least 40 nm. If it is less than 40 nm, the number of channels in WDM is likely to be too small. Such a wavelength width is more preferably at least 50 nm, still further preferably at least 60 nm, particularly preferably at least 80 nm, most preferably at least 90 nm.

TABLE 7

|  | Example 32 | | Example 33 | | Example 34 | |
|---|---|---|---|---|---|---|
|  | Core | Clad | Core | Clad | Core | Clad |
| $Bi_2O_3$ | 52.8 | 52.8 | 44.7 | 42.7 | 42.7 | 42.7 |
| $B_2O_3$ | 28.5 | 28.5 | 28.5 | 28.5 | 28.5 | 28.5 |
| $SiO_2$ | 14.3 | 14.3 | 19.2 | 21.2 | 14.2 | 14.2 |
| $CeO_2$ | 0.2 | 0.2 | 0.4 | 0.4 | 0.2 | 0.3 |
| $Al_2O_3$ | 7.1 | 10.6 | 0 | 0 | 7.2 | 14.3 |
| $Ga_2O_3$ | 7.1 | 3.6 | 7.2 | 7.2 | 7.2 | 0 |
| Er | 0.6 | 0 | 1.5 | 0 | 0.06 | 0 |
| Diameter | 2.5 | 125 | 3.5 | 124 | 7.0 | 125 |
| $T_g$ | 420 | 420 | 413* | 414 | 421* | 422 |
| Refractive index | 2.03 | 2.02 | 2.03* | 2.02 | 2.03* | 2.01 |
| Δn/n | 0.0049 | | 0.0049 | | 0.0099 | |

TABLE 8

|  | Example 35 | | Example 36 | | Example 37 | |
|---|---|---|---|---|---|---|
|  | Core | Clad | Core | Clad | Core | Clad |
| $Bi_2O_3$ | 59.95 | 59.95 | 44.7 | 42.7 | 42.7 | 42.7 |
| $B_2O_3$ | 20 | 20 | 0 | 0 | 26.5 | 28.5 |
| $SiO_2$ | 18 | 20 | 55.1 | 57.1 | 21.5 | 21.4 |
| $CeO_2$ | 0.05 | 0.05 | 0.2 | 0.2 | 0.1 | 0.2 |
| $Ga_2O_3$ | 2 | 0 | 0 | 0 | 0 | 0 |
| $TeO_2$ | 0 | 0 | 0 | 0 | 9.2 | 7.2 |
| Er | 0.005 | 0 | 0.1 | 0 | 0.5 | 0 |
| $T_g$ | 361 | 362* | 453 | 455* | 402 | 402* |
| Refractive index | 2.11* | 2.10* | 2.02* | 2.00* | 2.04* | 2.03* |
| Δn/n | 0.0047 | | 0.0099 | | 0.0049 | |

An optical amplifier employing the optical amplifying fiber of Example 32, was prepared. A pumping light with an intensity of 100 mW and a wavelength of 0.98 μm and a signal light with an intensity of 1 mW and a wavelength of from 1.50 to 1.59 μm were introduced, whereby the intensity of the output signal light was at least 10 mW.

Further, a laser apparatus employing the optical amplifying fiber of Example 32, was prepared, and a laser oscillation test was carried out by changing the transmission area of a narrow-band-pass filter within a range of from 1.50 to 1.59 μm. A pumping light with an intensity of 100 mW and a wavelength of 0.98 μm, was introduced, whereby laser oscillation was confirmed within a wide wavelength range of from 1.50 to 1.59 μm.

INDUSTRIAL APPLICABILITY

As described in the foregoing, by the optical amplifying glass of the present invention, optical amplification of a broader band can be made possible, and transmission of a large volume of information by a wavelength division multiplexing optical communication system can be made possible.

Further, even when a laser beam with high intensity is used as a pumping light for the optical amplification, thermal damage is less likely to occur.

Further, it is possible to obtain an optical amplifying glass, whereby precipitation of crystals scarcely takes place during forming such as fiber processing, whereby forming such as fiber processing will be easy.

Further, according to the present invention, an optical amplifying medium is obtainable, whereby a broad band gain is obtainable within a wavelength range of from 1.45 to 1.64 μm and thermal damage due to a pumping light is less likely to occur. Further, it is possible to obtain a resin-coated optical amplifying medium having high breaking strength. By an optical amplifier for WDM employing this optical amplifying medium, the number of wavelength division multiplexing channels in WDM can be increased. Further, by a laser apparatus employing this optical amplifying medium, a laser oscillation will be possible within a wide wavelength range of from 1.50 to 1.59 μm.

What is claimed is:

1. An optical amplifying glass comprising a matrix glass, and, added thereto, from 0.01 wt % to 10 wt % of Er, wherein said matrix glass substantially comprises, as represented by mol %:

| | |
|---|---|
| $Bi_2O_3$ | 20 to 70, |
| $B_2O_3$ | 0 to 14.99, |
| $SiO_2$ | 15 to 79.99, |
| $CeO_2$ | 0.01 to 10, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |
| $Ga_2O_3$ | 0 to 30, and |
| $Al_2O_3$. | 0 to 10 |

2. An optical amplifying medium comprising a core glass and a clad glass, wherein a relation of:

$$0.0005 \leq (n_1 - n_2)/n_1 \leq 0.1$$

wherein $n_1$ and $n_2$ are refractive indices of the core glass and the clad glass, respectively, to light with a wavelength of 1.55 μm, is satisfied, and the core glass is an optical amplifying glass according to claim 1.

3. A resin-coated optical amplifying medium wherein the optical amplifying medium as defined in claim 2 is covered with a resin.

4. The optical amplifying medium according to claim 2, wherein said clad glass contains $Bi_2O_3$ within a range of from 20 mol % to 80 mol %, and said clad glass contains at least one of $B_2O_3$ and $SiO_2$.

5. The optical amplifying medium according to claim 4, wherein said clad glass contains $CeO_2$ within a range of from 0.01 mol % to 10 mol %.

6. The optical amplifying medium according to claim 4, wherein said clad glass substantially comprises, as represented by mol %:

| | |
|---|---|
| $Bi_2O_3$ | 20 to 80, |
| $B_2O_3$ | 0 to 74.89, |
| $SiO_2$ | 0 to 79.99, |
| $CeO_2$ | 0.01 to 10, |
| $LiO_2$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |
| $Ga_2O_3$ | 0 to 30, and |
| $Al_2O_3$ | 0 to 30. |

7. The optical amplifying medium according to claim 6, wherein the total content of $B_2O_3$ and $SiO_2$ in said clad glass is from 5 mol % to 74.79 mol %.

8. The optical amplifying medium according to claim 6, wherein said clad glass contains at least one of $Ga_2O_3$ and $Al_2O_3$ in a total content of from 0.1 mol % to 30 mol %.

9. An optical amplifying glass comprising a matrix glass and, added thereto, from 0.01 wt % to 10 wt % of Er, wherein said matrix glass substantially comprises, as represented by mol %:

| | |
|---|---|
| $Bi_2O_3$ | 30 to 80, |
| $B_2O_3$ | 15 to 69, |
| $SiO_2$ | 0 to 50, |
| $CeO_2$ | 0.01 to 10, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |
| $Ga_2O_3$ | 0 to 30, and |
| $Al_2O_3$ | 0 to 10-. | with the proviso that the total content of $SO_2$, $Li_2O$, $TiO_2$, $ZrO_2$ and $SnO_2$ in said matrix glass is from 0 mol % to 50 mol %.

10. An optical amplifying medium comprising a core glass and a clad glass, wherein a relation of:

$$0.0005 \leq (n_1 - n_2)/n_1 \leq 0.1$$

wherein $n_1$ and $n_2$ are refractive indices of the core glass and the clad glass, respectively, to light with a wavelength of 1.55 μm, is satisfied, and the core glass is the optical amplifying glass according to claim 9.

11. A resin-coated optical amplifying medium wherein the optical amplifying medium as defined in claim 10 is covered with a resin.

12. The optical amplifying medium according to claim 10, wherein said clad glass contains $Bi_2O_3$ within a range of from 20 mol % to 80 mol %, and said clad glass contains at least one of $B_2O_3$ and $SiO_2$.

13. The optical amplifying medium according to claim 12, wherein said clad glass contains $CeO_2$ within a range of from 0.01 mol % to 10 mol %.

14. The optical amplifying medium according to claim 6, wherein said clad glass substantially comprises, as represented by mol %:

| | |
|---|---|
| $Bi_2O_3$ | 20 to 80, |
| $B_2O_3$ | 0 to 74.89, |
| $SiO_2$ | 0 to 79.99, |
| $CeO_2$ | 0.01 to 10, |
| $LiO_2$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, |

| | |
|---|---|
| Ga₂O₃ | 0 to 30, and |
| Al₂O₃ | 0 to 30. |

15. The optical amplifying medium according to claim 14, wherein the total content of $B_2O_3$ and $SiO_2$ in said clad glass is from 5 mol % to 74.79 mol %.

16. The optical amplifying medium according to claim 14, wherein said clad glass contains at least one of $Ga_2O_3$ and $Al_2O_3$ in a total content of from 0.1 mol % to 30 mol %.

17. An optical amplifying glass comprising a matrix glass and, added thereto, from 0.01 wt % to 10 wt % of Er, wherein said matrix glass substantially comprises, as represented by mol %:

| | |
|---|---|
| Bi₂O₃ | 25 to 70, |
| B₂O₃ | 0 to 74.89, |
| SiO₂ | 0 to 74.89, |
| CeO₂ | 0.01 to 10, |
| Li₂O | 0 to 50, |
| TiO₂ | 0 to 50, |
| ZrO₂ | 0 to 50, |
| SnO₂ | 0 to 50, |
| WO₃ | 0 to 30, |
| TeO₂ | 0 to 30, |
| Ga₂O₃ | 0 to 30, and |
| Al₂O₃ | 0 to 10-. | with the proviso that in said matrix glass, the total content of $B_2O_3$ and $SiO_2$ is from 5 mol % to 74.89 mol %, and the total content of $WO_3$, $TeO_2$ and $Ga_2O_3$ is from 0.1 mol % to 30 mol %.

18. An optical amplifying medium comprising a core glass and a clad glass, wherein a relation of:

$$0.0005 \leq (n_1-n_2)/n_1 \leq 0.1$$

wherein $n_1$ and $n_2$ are refractive indices of the core glass and the clad glass, respectively, to light with a wavelength of 1.55 μm, is satisfied, and the core glass is the optical amplifying glass according to claim 17.

19. A resin-coated optical amplifying medium wherein the optical amplifying medium as defined in claim 18, is covered with a resin.

20. The optical amplifying medium according to claim 18, wherein said clad glass contains $Bi_2O_3$ within a range of from 20 mol % to 80 mol %, and said clad glass contains at least one of $B_2O_3$ and $SiO_2$.

21. The optical amplifying medium according to claim 20, wherein said clad glass contains $CeO_2$ within a range of from 0.01 mol % to 10 mol %.

22. The optical amplifying medium according to claim 20, wherein said clad glass substantially comprises, as represented by mol %:

| | |
|---|---|
| Bi₂O₃ | 20 to 80, |
| B₂O₃ | 0 to 74.89, |
| SiO₂ | 0 to 79.99, |
| CeO₂ | 0.01 to 10, |
| LiO₂ | 0 to 50, |
| TiO₂ | 0 to 50, |
| ZrO₂ | 0 to 50, |
| SnO₂ | 0 to 50, |
| WO₃ | 0 to 30, |
| TeO₂ | 0 to 30, |
| Ga₂O₃ | 0 to 30, and |
| Al₂O₃ | 0 to 30. |

23. The optical amplifying medium according to claim 22, wherein the total content of $B_2O_3$ and $SiO_2$ in said clad glass is from 5 mol % to 74.79 mol %.

24. The optical amplifying medium according to claim 22, wherein said clad glass contains at least one of $Ga_2O_3$ and $Al_2O_3$ in a total content of from 0.1 mol % to 30 mol %.

25. An optical amplifying glass comprising a matrix glass and, added thereto, from 0.01 wt % to 10 wt % of Er, wherein said matrix glass substantially comprises, as represented by mol %:

| | |
|---|---|
| Bi₂O₃ | 25 to 70, |
| B₂O₃ | 0 to 74.79, |
| SiO₂ | 0 to 74.79, |
| CeO₂ | 0.01 to 10, |
| Li₂O | 0 to 50, |
| TiO₂ | 0 to 50, |
| ZrO₂ | 0 to 50, |
| SnO₂ | 0 to 50, |
| WO₃ | 0 to 30, |
| TeO₂ | 0 to 30, |
| Ga₂O₃ | 0 to 30, and |
| Al₂O₃ | 0.1 to 10, | with the proviso that in said matrix glass, the total content of B203 and $SiO_2$ is from 5 mol % to 74.79 mol %, and the total content of $WO_3$, $TeO_2$ and $Ga_2O_3$ is from 0.1 mol % to 30 mol %.

26. An optical amplifying medium comprising a core glass and a clad glass, wherein a relation of:

$$0.0005 \leq (n_1-n_2)/n_1 \leq 0.1$$

wherein $n_1$ and $n_2$ are refractive indices of the core glass and the clad glass, respectively, to light with a wavelength of 1.55 μm, is satisfied, and the core glass is the optical amplifying glass according to claim 25.

27. A resin-coated optical amplifying medium wherein the optical amplifying medium as defined in claim 26, is covered with a resin.

28. The optical amplifying medium according to claim 26, wherein said clad glass contains $Bi_2O_3$ within a range of from 20 mol % to 80 mol %, and said clad glass contains at least one of $B_2O_3$ and $SiO_2$.

29. The optical amplifying medium according to claim 28, wherein said clad glass contains $CeO_2$ within a range of from 0.01 mol % to 10 mol %.

30. The optical amplifying medium according to claim 28, wherein said clad glass substantially comprises, as represented by mol %:

| | |
|---|---|
| Bi₂O₃ | 20 to 80, |
| B₂O₃ | 0 to 74.89, |
| SiO₂ | 0 to 79.99, |
| CeO₂ | 0.01 to 10, |
| LiO₂ | 0 to 50, |
| TiO₂ | 0 to 50, |
| ZrO₂ | |
| SnO₂ | 0 to 50, |

-continued

| | |
|---|---|
| $WO_3$ | 0 to 30, |
| $TeO_2$ | 0 to 30, |
| $Ga_2O_3$ | 0 to 30, and |
| $Al_2O_3$ | |

31. The optical amplifying medium according to claim 30, wherein the total content of $B_3O_3$ and $SiO_2$ in said clad glass is from 5 mol % to 74.79 mol %.

32. The optical amplifying medium according to claim 30, wherein said clad glass contains at least one of $Ga_2O_3$ and $Al_2O_3$ in a total content of from 0.1 mol % to 30 mol %.

* * * * *

UNITED STATES PATENT AND TRADEMARK OFFICE
CERTIFICATE OF CORRECTION

PATENT NO. : 6,620,748 B1
DATED : September 16, 2003
INVENTOR(S) : Sugimoto et al.

It is certified that error appears in the above-identified patent and that said Letters Patent is hereby corrected as shown below:

<u>Title page,</u>
Item [22], PCT Filing Date, should read:
-- [22] PCT Filed: Oct. 19, 1999 --
Item [75], Inventors, should read:
-- [75] Inventors: Naoki Sugimoto, Kanagawa (JP);
  Yutaka Kuroiwa, Kanagawa (JP);
  Setsuro Ito, Kanagawa (JP);
  Setsuhisa Tanabe, Kyoto (JP);
  Teiichi Hanada, Hyogo (JP) --

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,620,748 B1
DATED         : September 16, 2003
INVENTOR(S)   : Sugimoto et al.

It is certified that error appears in the above-identified patent and that said Letters Patent is hereby corrected as shown below:

Title page,
Item [73], Assignee, should read:
-- [73]  Assignee: Asahi Glass Company, Limited,
                   Tokyo, (JP) --

Signed and Sealed this

Twenty-seventh Day of April, 2004

JON W. DUDAS
*Acting Director of the United States Patent and Trademark Office*